(12) United States Patent
Fangmeyer et al.

(10) Patent No.: US 6,768,561 B1
(45) Date of Patent: *Jul. 27, 2004

(54) METHOD FOR SIGNAL PROCESSING

(75) Inventors: Dieter Fangmeyer, Kiel (DE);
Christian Wiechering, Kiel (DE);
Bernd Lübcke, Molfsee (DE)

(73) Assignee: Hell Gravure Systems GmbH, Kiel (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/445,069

(22) PCT Filed: May 29, 1998

(86) PCT No.: PCT/DE98/01469
§ 371 (c)(1),
(2), (4) Date: Feb. 28, 2000

(87) PCT Pub. No.: WO98/55306
PCT Pub. Date: Dec. 10, 1998

(30) Foreign Application Priority Data

Jun. 2, 1997 (DE) ......................................... 197 23 002

(51) Int. Cl.⁷ ........................ H04N 1/40; G06K 15/00; B41C 1/04; B41C 1/02; B41C 1/045; B41M 1/10
(52) U.S. Cl. .................. 358/3.29; 358/3.31; 358/3.32; 101/170; 101/463.1
(58) Field of Search .............................. 358/3.29, 406, 358/3.32, 3.31, 1.9; 382/325; 101/3.1–32; 219/68–70; 409/86–91; 700/159–195, 153, 202

(56) References Cited

U.S. PATENT DOCUMENTS

| | | | | |
|---|---|---|---|---|
| 4,357,633 A | * | 11/1982 | Buechler | .................. 358/3.32 |
| 4,438,460 A | * | 3/1984 | Buechler | .................. 358/3.32 |
| 4,450,486 A | * | 5/1984 | Buechler | .................. 358/3.29 |
| 4,500,929 A | * | 2/1985 | Buechler | .................. 358/3.29 |
| 5,029,011 A | | 7/1991 | Fraser | ........................ 358/299 |
| 5,491,559 A | | 2/1996 | Buechler | .................. 358/299 |
| 5,663,803 A | | 9/1997 | Beckett et al. | .............. 358/299 |
| 6,007,230 A | * | 12/1999 | Beckett et al. | .............. 700/160 |
| 6,430,462 B1 | * | 8/2002 | Lubcke et al. | .............. 700/160 |
| 6,523,467 B2 | * | 2/2003 | Fangmeyer et al. | .......... 101/32 |

FOREIGN PATENT DOCUMENTS

| | | | | |
|---|---|---|---|---|
| DE | 2508734 B1 | * | 8/1976 | ............. B41C/1/04 |
| DE | WO9855304 | * | 12/1998 | ........... B41C/1/045 |
| JP | 9141815 | * | 3/1997 | ........... B41C/1/045 |
| WO | WO 96/26836 | | 9/1996 | ............. B41C/1/02 |
| WO | WO 96/34746 | | 11/1996 | ............. B41C/1/02 |

* cited by examiner

Primary Examiner—Kimberly Williams
Assistant Examiner—Melanie M. Vida
(74) Attorney, Agent, or Firm—Schiff Hardin LLP

(57) ABSTRACT

In a method for processing signals in an electronic engraving machine for engraving printing forms, in particular printing cylinders used for rotogravure, an engraving control signal is obtained by superimposing engraving data, representing tone values between "white" and "black" which are to be engraved, with a periodic screen signal for generating a gravure screen. The engraving control signal guides the lifting movement of the stylus of an engraving element. As a result of the lifting movement of the stylus, a series of cups arranged in the gravure screen is engraved on the printing form. To compensate an incorrect lifting movement of the stylus (rebound effect, lag effect), the engraving data undergo digital filtering before superposition of the gravure screen.

23 Claims, 7 Drawing Sheets

METHOD FOR SIGNAL PROCESSING

BACKGROUND OF THE INVENTION

The invention is in the field of electronic reproduction technology and is directed to a method for signal processing in an electronic engraving machine for engraving printing forms, particularly printing cylinders, for rotogravure.

In an electronic engraving machine, for example, an electromagnetic engraving element having an engraving stylus as a cutting tool moves in an axial direction along a rotating printing cylinder. The engraving stylus controlled by an engraving control signal cuts a sequence of depressions, called cups, arranged in a rotogravure raster into the generated surface of the printing cylinder. The engraving control signal is formed in a signal editing unit by superimposition of an engraving signal representing the gradations between "light" (white) and "dark" (black) with a periodic raster signal (vibration). Whereas the raster signal effects a vibrating lifting motion of the engraving stylus for generating the raster, the engraving signal controls the cut depths of the cups engraved into the generated surface of the printing cylinder according to the gradations to be reproduced.

DE-A 23 36 089 discloses an electromagnetic engraving element, i.e. an engraving element having an electromagnetic drive element for the engraving stylus. The electromagnetic drive element is composed of a stationary electromagnet charged with the engraving signal in whose air gap the armature of a rotatory system moves. The rotatory system is composed of a shaft, the armature, a bearing for the shaft and of a damping unit. One shaft end merges into a resilient torsion rod clamped stationary in space, whereas the other shaft end carries a lever to which the engraving stylus is attached. The magnetic field generated in the electromagnet exerts an electrical torque onto the armature of the shaft, this being opposed by the mechanical torque of the torsion rod. The electrical torque deflects the shaft out of a quiescent position by a rotational angle proportional to the engraving signal, and the torsion rod returns the shaft into the quiescent position. As a result of the rotational movement of the shaft, the engraving stylus implements a stroke directed in the direction onto the generated surface of the printing cylinder, this defining the penetration depth of the engraving stylus into the printing cylinder.

Since the electromagnetic engraving element represents an oscillatable system, the engraving stylus exhibits a faulty trenchant response, particularly given engraving signal discontinuities at steep contours, that considerably deteriorates the engraving quality.

In what is referred to as the lag effect, the engraving stylus achieves the rated engraving depth at a contour predetermined by the engraving signal value only with a delay, and an unsharp engraving of an intrinsically steep contour is the result. The cause of the lag effect is, for example, the non-ideal properties of the mechanical damping.

In what is referred to as the rebound effect, the engraving stylus executes oscillations with the mechanical inherent frequency at a contour due to an inadequate mechanical damping, and the engraving stylus engraves a disturbing multiple contour.

In what is known as the hysteresis effect, the engraving stylus, due to the non-ideal properties of the mechanical damping, never achieves the rated engraving depth prescribed by the engraving signal value. When, for example, a black tone is engraved in a gray area, the hysteresis effect is expressed in that a darker gray arises behind the black gradation.

EP-B-0 437 421 has already disclosed a method with which the trenchant response of an electromagnetic engraving element is improved with a specific electronic drive of the engraving element. For that purpose, the engraving signal is briefly intermediately stored in a memory unit and is supplied to the engraving element delayed by the storage time. During the storage time, a correction signal variable in amplitude and duration of effect is derived from the engraving signal, this being supplied to the engraving element with a time advance. The compensation of the aforementioned, disturbing effects of the engraving element, the generation of the raster signal and the superimposition of the raster signal with the corrected engraving signal in order to acquire the engraving control signal for driving the engraving element are among the things that occur the signal editing unit.

In a traditional signal processing unit, the signals are processed analog, in that the input signals are supplied in digital form, are digital-to-analog converted and are operated with one another in analog networks, whereby the resulting signal is then amplified in an analog amplifier and is output as engraving control signal for the engraving element.

The compensation of the disturbing effects of the engraving element with analog networks has the disadvantage that the transfer behavior of the analog networks cannot be optimally adapted without further ado to the transfer behavior of the engraving elements, and that the analog networks, due to tolerances and temperature-dependencies of the components, are not stable enough in order to generate a good long-term stability and, thus, engraving quality.

WO-A-9 634 746 discloses a method for signal processing in an electronic engraving machine, whereby the engraving data are already subjected to a digital filtering. The disadvantage of this method is comprised therein that the digital filtering ensues after the superimposition of engraving signal and raster signal.

It is therefore an object of the present invention to improve a method for signal processing in an electronic engraving machine for engraving printing forms, particularly printing cylinders, for rotogravure such that disturbing effects of an engraving element are compensated as completely as possible in order to achieve a good engraving quality.

According to the present method for signal processing in an electronic engraving machine for engraving a printing form for rotogravure, engraving data are provided to represent gradations between "white and "black" to be engraved. The engraving data are subjected to a digital filtering for compensation of a faulty lifting motion of an engraving stylus of an engraving element. An engraving control signal is acquired by superimposition of the engraving data with a periodic raster signal for generating an engraving raster. The engraving control signal controls a lifting motion of the engraving stylus of the engraving element. A sequence of cups arranged in the engraving raster is engraved into the printing form with a lifting motion of the engraving stylus.

The invention is explained in greater detail below with reference to FIGS. 1 through 9.

DESCRIPTION OF THE PREFERRED EMBODIMENTS

Figure 1:
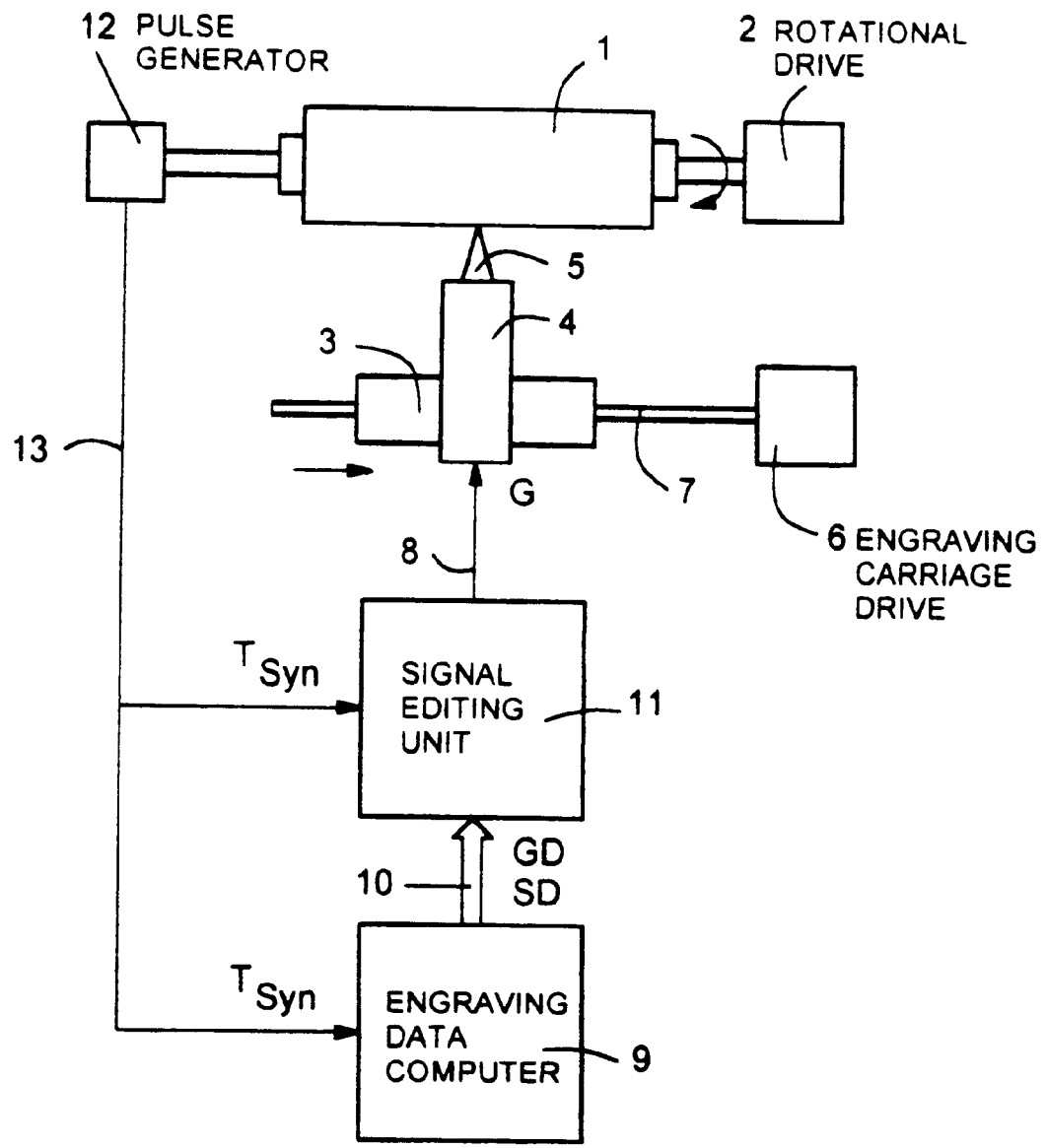
FIG. 1 is a schematic block circuit diagram of an engraving machine for engraving printing cylinders comprising a signal editing unit.

FIG. 1 shows a schematic block circuit diagram of an engraving machine for engraving printing cylinders. A printing cylinder 1, is rotationally driven by a rotational drive 2. An engraving element 4 with an engraving stylus 5 as cutting tool that is mounted on an engraving carriage 3 moves along the rotating printing cylinder 1 in an direction with the assistance of a spindle 7 driven by an engraving carriage drive 6.

The engraving stylus 5 of the engraving element 4 controlled by an analog engraving control signal (G) on a line 8 cuts a sequence of cups arranged in an engraving raster into the generated surface of the rotating printing cylinder 1 engraving line by engraving line while the engraving element 4 moves axially along the printing cylinder 1. For example, the engraving element 4 is equipped with an electromagnetic drive for the engraving stylus 5.

Whereas a periodic raster signal effects a vibrating lifting motion of the engraving stylus (5) for generating the engraving raster, the engraving data GD determine the geometrical parameters of the engraved cups such as transverse diagonal, longitudinal diagonal and engraving depth according to the gradations between "light" and "dark" to be engraved.

The engraving data (GD) are offered engraving line by engraving line in an engraving data computer 9, whereby an engraving datum (GD) having at least one byte is allocated to each cup to be engraved, this containing, among other things, the gradation to be engraved as engraving information. The engraving data computer 9 also offers control data (SD) for the signal processing.

Engraving data (GD) and control data (SD) are forwarded via a data bus 10 to a signal processing unit 11 wherein the engraving control signal (G) for the engraving element 4 is generated.

For synchronization of the signal processing with the rotational movement of the printing cylinder 1, a pulse generator 12 is mechanically coupled to the printing cylinder 1. The pulse generator 12 generates a synchronization clock sequence ($T_{SYN}$) that is forwarded via a line 13 to the engraving data computer 9 and to the signal editing unit 11.

Figure 2:
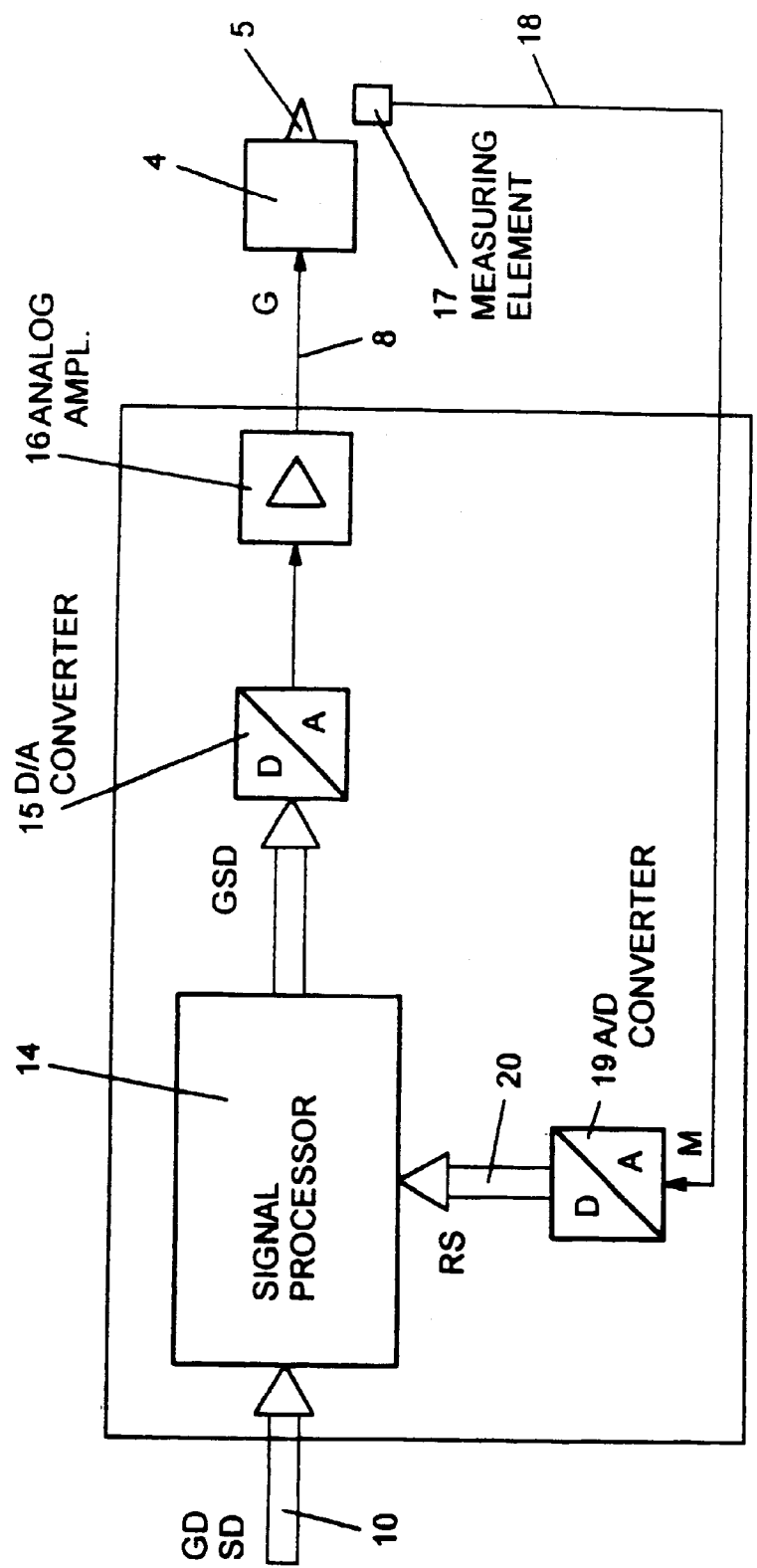
FIG. 2 is an exemplary embodiment of the signal editing unit.

FIG. 2 shows an exemplary embodiment of the signal editing unit 11 in which the engraving data (GD) and the control data (SD) are communicated via the data bus 10 to a signal processor (14). In the signal processor 14, the engraving data (GD) are converted into engraving control data (GSD) according to a transfer function.

$$GSD = (GD \times k_1 + KD \times k_2) \times (EP_L \times k_3) + EP_T \times k_4 + FD \times k_5$$

noting in the transfer function are:

GD=Engraving data (input data)
GSD=Engraving control data (output data)
KD=Correction data for cut depth correction
$EPL_L$=Setting value for "light"
$EPT_T$=Setting value for "dark"
FD=Function value data for generating the raster signal, and
$k_x$=Transfer coefficient of the transfer function A digital signal processor (DSP) is preferably employed as signal processor 14, this enabling fast floating decimal point operations, for example a digital signal processor of the type TMS 320C31 of Texas Instruments.

The engraving control data (GSD) acquired in the signal processor 14 are converted into the analog engraving control signal (G) in a D/A converter 15, this signal being subsequently amplified in a following, analog amplifier 16 and being forwarded via the line 8 to the engraving element 4 for driving the engraving stylus 5. The amplifier 16, can, for example, be fashioned as switched power amplifier.

For a regulation, a measuring element 17, can be attached to the engraving element 4, this measuring the lifting motion of the engraving stylus 5 of the engraving element (4) in the exemplary embodiment. Another measuring element can acquire the operating temperature of the engraving element 4. The corresponding, analog measured signals (M) are supplied via a feedback line 18 to an A/D converter 19. The A/D converter 19 converts the analog measured signals (M) into feedback data (RD) that are supplied to the signal processor 14 via a control bus 20.

Figure 3:
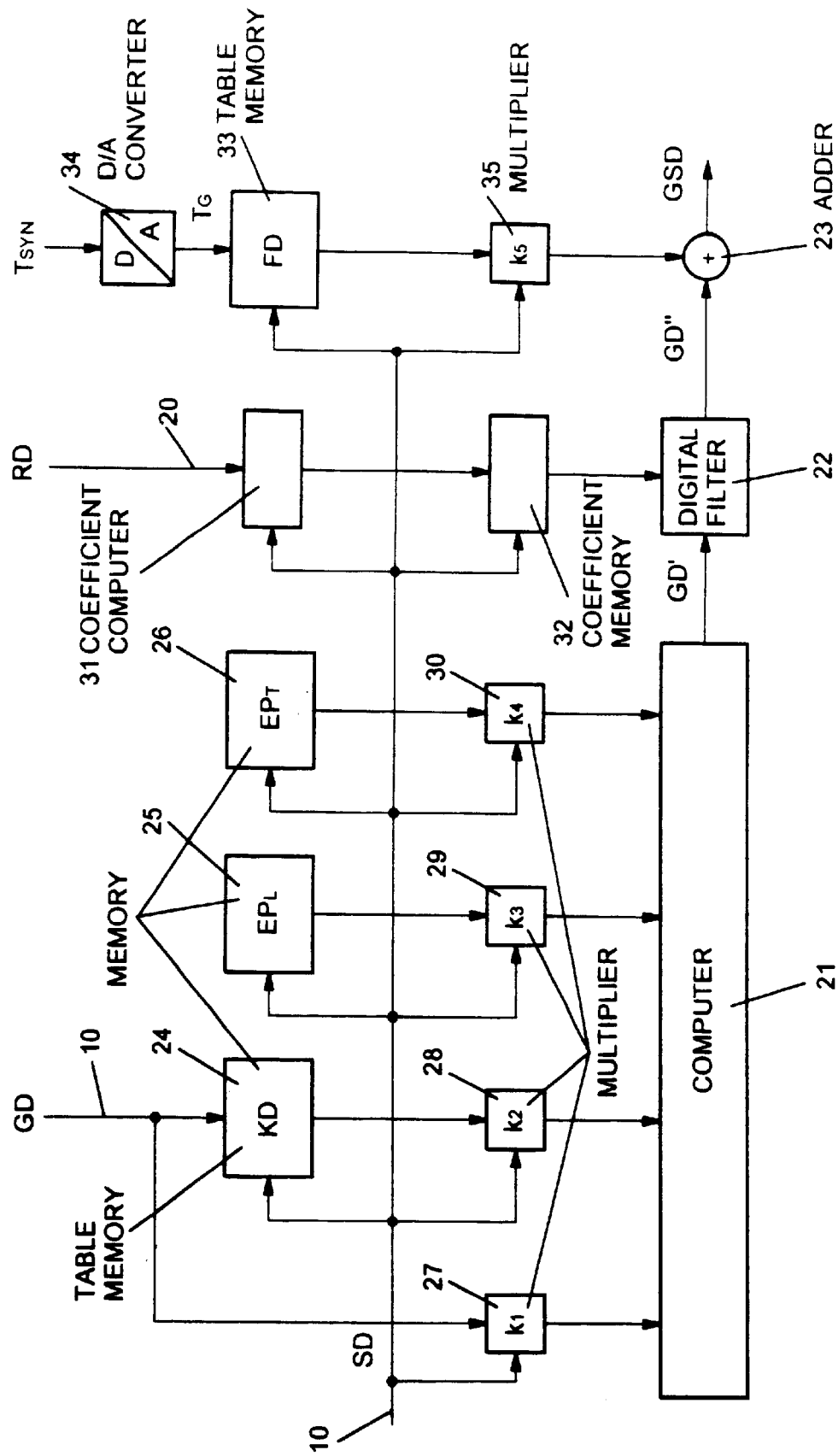
FIG. 3 is an exemplary embodiment of a signal processor.

FIG. 3 shows an exemplary embodiment of the signal processor 14. The signal processor 14 fundamentally comprises a computer 21, a digital filter 22 and an adder 23, these being connected in series.

In the computer 21, the engraving data GD are first corrected according to an equation 1.

$$GD' = (GD \times k_1 + KD \times k_2) \times (EP_L \times k_3) + EP_T \times k_4 \quad (1)$$

denoting in equation (1) are:
GD=Engraving data
GD'=Corrected engraving data
KD=Correction data for a cut depth correction
$EP_L$=Setting values for "light"
$EP_T$=Setting values for "dark", and
$k_x$=Transfer coefficient The correction of the engraving data (GD) is composed of a cut depth correction for compensation of a mechanical wear of the engraving stylus 5 of the engraving element 4 and of a calibration of the engraving data (GD) for "light" and "dark", whereby the calibration of the engraving data (GD) ensues such that the engraved cups for the gradations "light" and "dark" correspond to the predetermined rated gradations for "light" and "dark".

For correction of the engraving data "GD", a correction value table KD =f(GD) for the cut depth correction is loaded in a first table memory 24, this being addressable by the engraving data (GD) on the data bus 10. Two parameter memories (25, 26) contain the setting values ($EP_L$, $EP_T$) for "light" and "dark". On the basis of the control data (SD) on the data bus 10, a new correction value table KD=f(GD) can be loaded into the table memory 24 and new setting values ($EP_L$, $EP_T$) can be loaded into the parameter memories 25, 26. The engraving data (GD) and the quantities read out from the memories 24, 25, 26 are weighted in multipliers 27, 28, 29, 30 with the transfer coefficients ($k_1$, $k_2$, $k_3$, $k_4$) stored thereat, these being likewise capable of being modified by the control data (SD). The corrected engraving data (GD') are supplied to the digital filter 22.

In the digital filter 22 the corrected engraving data (GD') are subjected—for linear compensation of the disturbing effects of the engraving element 4 such as the rebound and lag effect—to a digital filtering according to the filter function H(z) with statistical filter coefficients $a_n$ and $b_n$ in order to obtain the corrected and filtered engraving data (GD").

$$H(z) = \frac{GD''}{GD'} = \frac{a_0 + a_1 \cdot z^{-1} + a_2 \cdot z^{-2} + \ldots + a_n \cdot z^{-n}}{1 + b_1 \cdot z^{-1} + b_2 \cdot z^{-2} + \ldots + b_n \cdot z^{-n}}$$

The filtering of the engraving data (GD') occurs before the superimposition of the raster signal. As a result thereof, work can be advantageously carried out with constant digital filters, since the filter coefficients $a_n$ and $b_n$ are then not dependent on the setting values for "light" and "dark". Moreover, calculating time is saved since the raster signal need not be taken into consideration in the signal filtering.

The filter coefficients $a_n$ and $b_n$ are calculated in the coefficient computer 31 and are stored in a coefficient memory 32 from which they are input into the digital filter 22. The filter coefficients $a_n$ and $b_n$ are generated such that the disturbing effects of the engraving element 4 are just compensated, whereby the filter coefficients $a_n$ are dimensioned such as gain factor that the gain of the overall digital filter 22 is equal to "1". The time behavior of the digital filter 2 derives from the pull positions and the 0 positions of the filter function.

The calculation of the required filter coefficients $a_n$ and $b_n$ is implemented with the assistance of calculation parameters that are supplied to the coefficient computer 31 via the control data (SD). With the assistance of the control data (SD), previously calculated sets of filter coefficients $a_n$ and $b_n$ can also be selected in the coefficient memory 32 and be transmitted to the digital filter 22.

The calculation of the filter coefficients $a_n$ and $b_n$ can occur dependent on previously determined parameters (zero positions and pole positions) that describe the transfer function of the respectively employed engraving element 4. The transfer function of the engraving element 4 thereby indicates the relationship between the measured stroke of the engraving stylus 5 of the engraving element 4 and the supplied engraving control signal (G).

In an advantageous improvement, the filter coefficients $a_n$ and $b_n$—alternatively or additionally—are calculated dependent on at least one engraving parameter such as frequency and amplitude of the periodic raster signal and/or characteristic resonance and degree of damping of the engraving element 4.

In another advantageous development, the filter coefficients $a_n$ and $b_n$ are calculated once dependent on measured values, being calculated via the stroke motion of the engraving stylus 5 and/or via the operating temperature of the engraving element 4 or there are continuously modified by an adaptive control or regulation.

In the case of an adaptive control, rated values 4, for example, the operating temperature of the engraving element 4, and/or for the lifting motion of the engraving stylus 5 of the engraving element 4 are prescribed. The corresponding feedback data (RD) of the engraving element 4 are supplied as actual values to the coefficient computer 31 via the control bus 20 in which the filter coefficients ($a_n$, $b_n$) are calculated on line dependent on the comparison between rated values and actual values and are forwarded via the coefficient memory 32 to the digital filter 22.

In a practical exemplary embodiment, the engraving data (GD) are first filtered—for compensation of the lag effect—in a separate IIR filter or in a IIR part of an overall filter with fixed filter coefficients ($a_n$, $b_n$). Subsequently, the filtered engraving data (GD)—for compensation of the rebound effect—are filtered again in a separate, adaptive FIR filter or an adaptive FIR part of an overall filter with variable filter coefficients ($a_n$, $b_n$). A regulation of the lifting motion of the engraving stylus 5 of the engraving element 4 can thereby be achieved via the gain of the adaptive filter or filter part.

For compensation of the rebound effect, a FIR filter of at least the second order (FIR=finite impulse response) with two nulls is preferably employed. Since a simple mechanical oscillatory system can be considered to be the foundation of the cause of the rebound effect, the inverse function $H^{-1}(p)$ of the Laplace transform $H(p)$ is employed for compensation. The digital compensation function thus derives as Z-transform, deriving as: $H^{-1}(z) = a_0 + a_1 z^{-1} + a_2 z^{-2}$ with two nulls in the filter function.

Figure 4:
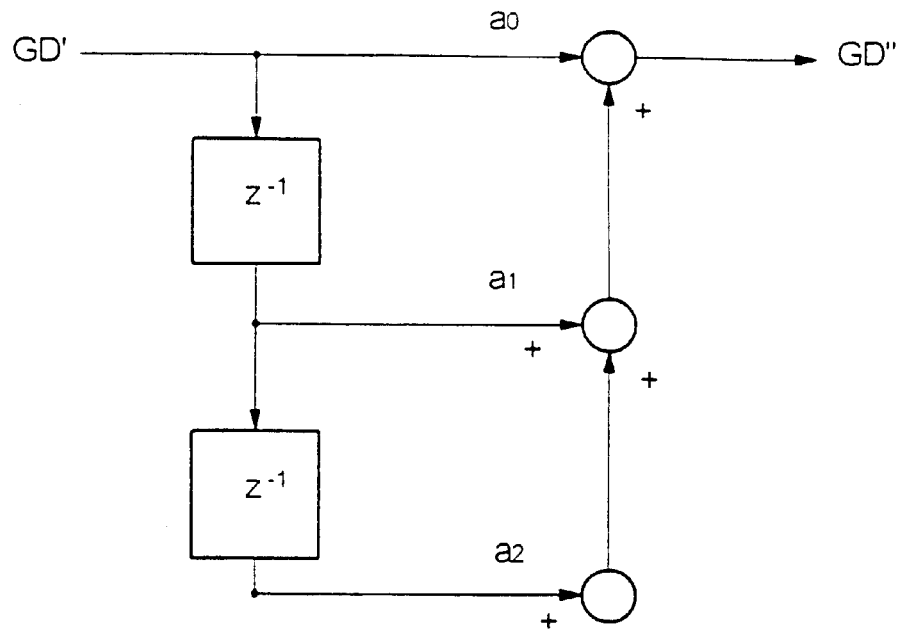
FIG. 4 is an exemplary embodiment of a FIR filter of the second order for compensation of the rebound effect of an engraving element.

FIG. 4 shows an exemplary embodiment of a FIR filter of the second order as individual filter for compensation of the rebound effect of the engraving element 4.

Figure 5:
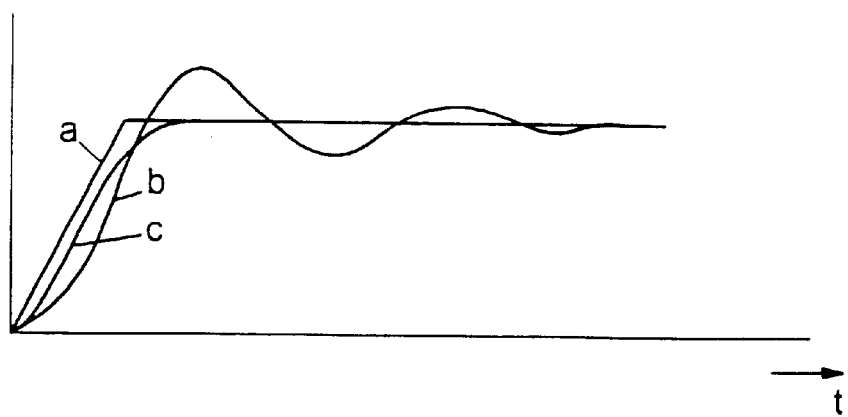
FIG. 5 is a graphic illustration directed to the compensation of the rebound effect.
Figure 7:
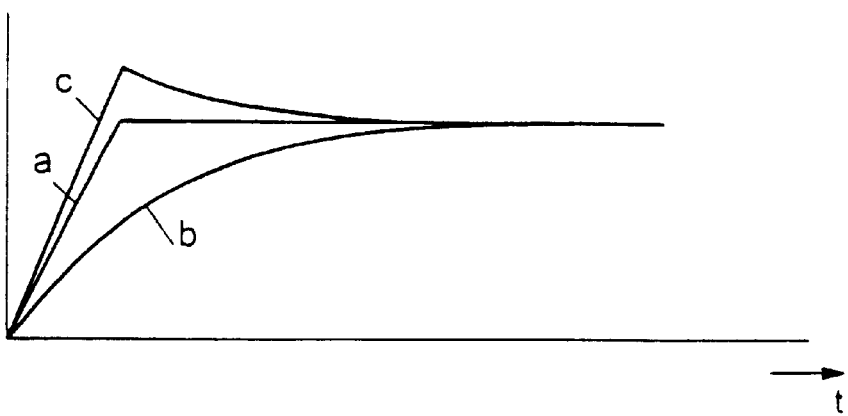
FIG. 7 is a graphic illustration relating to the compensation of the lag effects.

FIG. 5 graphically shows the rebound effect given a signal discontinuity of the engraving control signal (G) and the effect of the FIR filter in the compensation of the rebound effect, whereby (a) indicates the signal discontinuity of the engraving control signal (b) indicates the curve of the stylus motion given the unfiltered engraving control signal, and (c) indicates the curve of the stylus motion given the filtered engraving control signal as a function of the time t.

For the compensation of the lag effect, a IIR filter of at least second order (IIR=infinite impulse response) having one null and a pole position in the filter function is employed in a preferred way.

Figure 6:
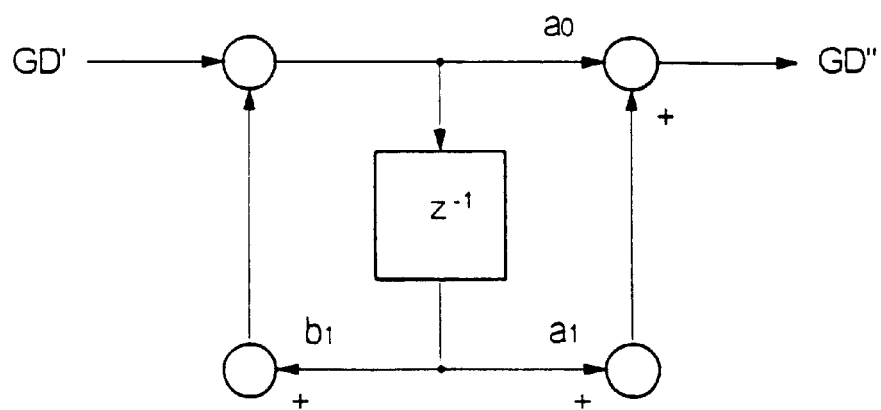
FIG. 6 is an exemplary embodiment for a IIR filter of the second order for compensation of the lag effect.

FIG. 6 shows an exemplary embodiment of a IIR filter of the second order as individual filter for compensation of the lag effect of the engraving element 4.

FIG. 4 graphically shows the lag effect and the effect of the IIR filter in the compensation of the lag effect, whereby (a) again indicates the signal discontinuity of the engraving control signal, (b) indicates the curve of the stylus motion given unfiltered engraving control signal and (c) indicates the curve of the stylus motion given the filtered engraving control signal as function of the time t.

The digital filter 22 can have a cascaded, parallel or a direct form.

The digital filter 22 is preferably a combined digital filter of the FIR/IIR type that is composed of a transverse part (FIR) with the filter coefficients $a_n$ and of a recursive part (IIR) with the filter coefficients $b_n$.

Figure 8:
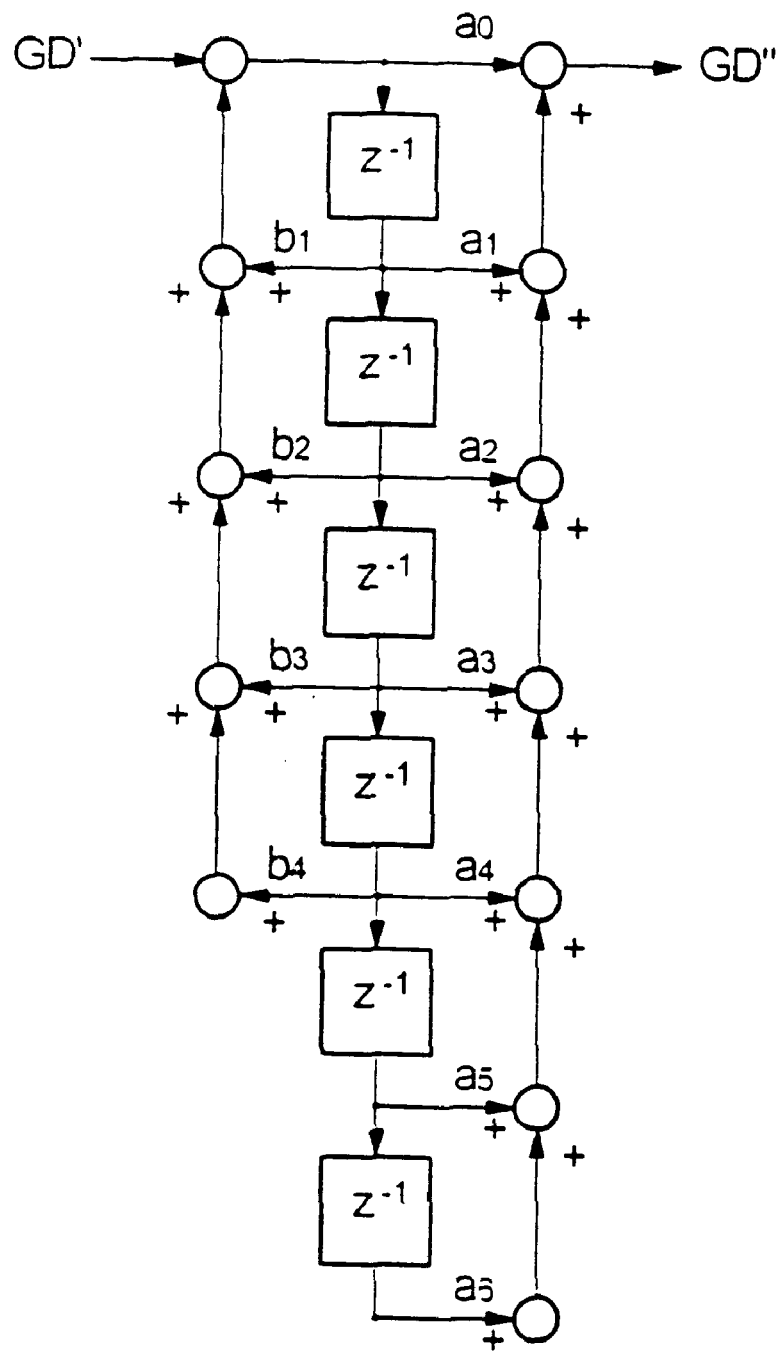
FIG. 8 is an exemplary embodiment of a combined FIR/IIR filter.

FIG. 8 shows a combined digital filter 22 of the FIR/IIR type that comprises 4 FIR stages with four pole positions and 6 IIR stages with six nulls.

The compensation of the non-linear hysteresis effect can ensue with a processing of the engraving data (GD) adapted to the hysteresis effect. The hysteresis effect in an engraving element 4 with an electromagnetic drive element arises due to the hysteresis in the iron packet of the electromagnet. Given a discontinuity of the engraving data (GD), the iron packet retains a residual magnetization dependent on the previously effective value of the engraving datum (GD), as a result whereof the engraving stylus, 5 of the engraving element 4 does not reach the rated engraving depth. Hysteresis, however, can also arise due to friction or, respectively, damping. This occurs, for example, in that the static friction is greater than the sliding friction. An engraving element having a piezoelectric drive element also behaves in a similar way.

Figure 9:
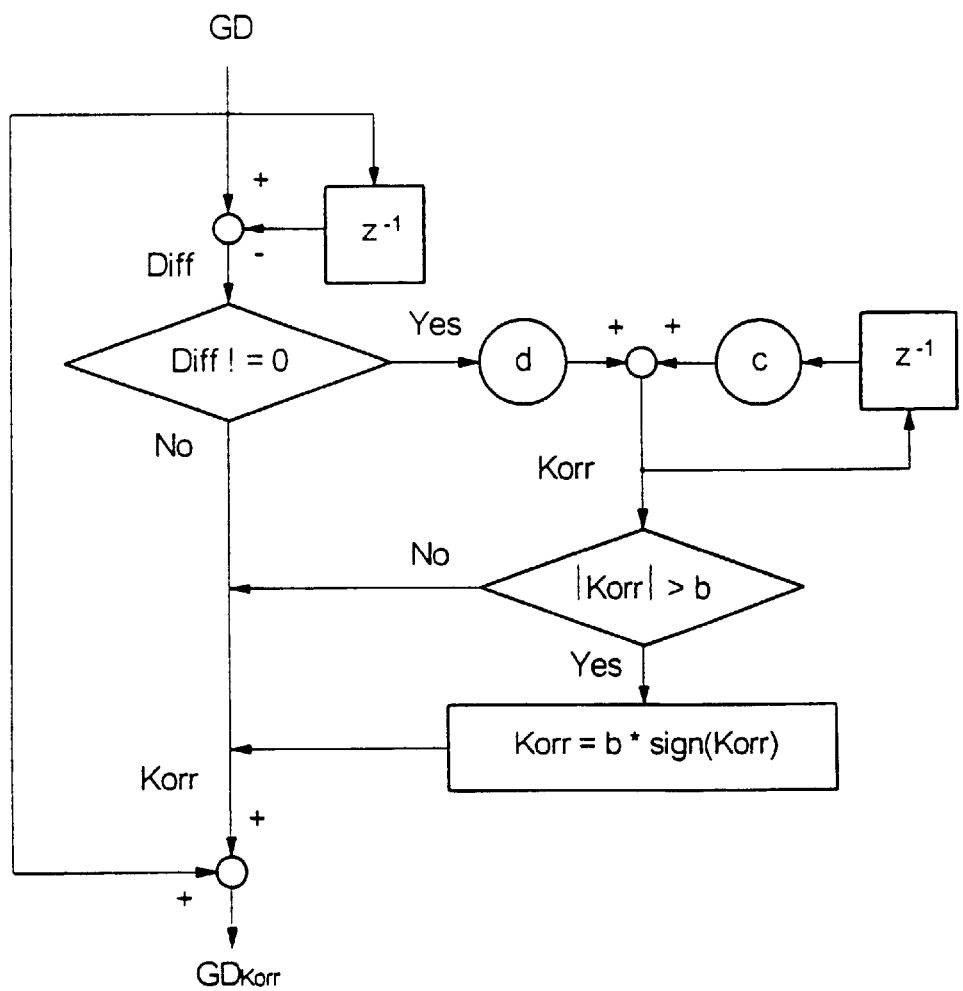
FIG. 9 is a flow chart relating to the compensation of the hysteresis effect.

As a result of the processing of the engraving data (GD) shown in the flow chart of FIG. 9, the hysteresis effect is compensated with the assistance of a hysteresis curve inverse relative to the hysteresis curve of the iron packet. On the basis of a corresponding selection of the parameters b, c and d, the inverse hysteresis curve can be modified in a versatile way. The parameter b is the width of the hysteresis curve. The parameters c and d define the behavior given a directional change of the engraving data (GD). The parameter c is thereby a factor that indicates how fast the magnetic pre-history in the iron packet should be "forgotten". The parameter d indicates the steepness of the transition in the hysteresis curve.

According to the flow chart shown in FIG. 9, the difference (Diff) between a current engraving datum GD(n) and the preceding engraving datum GD(n−1) is first calculated according to the following equation:

$$Diff = GD(n) - GD(n-1)$$

When the difference Diff=0 applies, i.e. when no discontinuity has occurred in the engraving data, the old correction value Korr(n−1) is retained. When the difference Diff≠0 applies, a new correction value Korr(n) is calculated according to the following equation:

$$Korr(n) = c \times Korr(n-1) + d \times Diff$$

Subsequently, the amount of the correction value Korr(n) is limited to b and, thus, the width of the hysteresis curve is defined. With the new correction value Korr(n), the corrected engraving datum (GD*) is subsequently calculated according to the following equation:

$$GD_{KORR-GD}(n) + Korr(n)$$

The signal processing for compensation of the hysteresis effect expediently ensues before the filtering in the digital filter (22).

After the compensation of the disturbing effects of the engraving element, the engraving control data (GSD) are acquired for driving the engraving element 4 in that the corrected and filtered engraving data (GD") have the raster signal in the form of weighted function value data (FD) added to them in the adder 23 according to equation (III).

$$GSD = GD'' + FD \times k_5 \tag{III}$$

The function data (FD) are deposited in a further table memory (33) as vibration table for generating the periodic raster signal. The function value data (FD) are read from the table memory (33) by an engraving clock sequence ($T_G$) that is acquired by frequency division in a frequency divider unit 34 from the control clock sequence ($T_{SYN}$) and defines the frequency of the raster signal. The function value data (FD) that are read out are weighted with the transfer coefficient ($k_5$) in a further multiplier 35 and are supplied to the adder 23. With the assistance of the control data (SD), a new vibration table can be loaded in to the table memory 33 and the transfer coefficient ($k_5$) in the multiplier 35 can be modified.

Although various minor changes and modifications might be proposed by those skilled in the art, it will be understood that our wish is to include within the claims of the patent warranted hereon all such changes and modifications as reasonably come within our contribution to the art.

We claim:

1. A method for signal processing in an electronic engraving machine for engraving a printing form for rotogravure, comprising the steps of:

providing engraving data that represent gradations between "white" and "black" to be engraved;

subjecting the engraving data to a digital filtering to create digitally filtered engraving data for compensation of a faulty lifting motion of an engraving stylus of an engraving element;

acquiring an engraving control signal by superimposition of the digitally filtered engraving data with a periodic raster signal for generating an engraving raster;

controlling with the engraving control signal a lifting motion of the engraving stylus of the engraving element; and engraving a sequence of cups arranged in the engraving raster into the printing form with the lifting motion of the engraving stylus.

2. The method according to claim 1, wherein the digital filtering of the engraving data occurs according to a filter function with static filter coefficients.

3. The method according to claim 1, wherein the filtering of the engraving data for the compensation of a rebound effect is implemented with a digital FIR filter of at least a second order.

4. The method according to claim 3 wherein the filter function of the FIR filter comprises two nulls.

5. The method according to claim 3 wherein the filtering of the engraving data for the compensation of a lag effect is implemented with a digital IIR filter of at least a second order.

6. The method according to claim 5 wherein the filter function of the IIR filter comprises one pole location and one null.

7. The method according to claim 5 wherein the FIR filter and the IIR filter are connected in series.

8. The method according to claim 5 wherein the FIR filter and the IIR filter are united to form a filter of the FIR/IIR type.

9. The method according to claim 2 wherein the filter coefficients are calculated dependent on a transfer function of the engraving element.

10. The method according to claim 2 wherein the filter coefficients are calculated dependent on engraving parameters relevant for the engraving of the printing form.

11. The method according to claim 10 wherein the filter coefficients are calculated dependent on at least one of the engraving parameters such as amplitude and frequency of the raster signal and/or characteristic frequency and degree of damping of the engraving element.

12. The method according to claim 2, wherein the lifting motion of the engraving stylus of the engraving element is measured; and the filter coefficients are calculated dependent on the measured lifting motion.

13. The method according to claim 2 wherein an operating temperature of the engraving element is measured; and the filter coefficients are calculated dependent on the measured operating temperature.

14. The method according to claim 2 wherein the lifting motion of the engraving stylus of the engraving element is measured to obtain measured lifting motion values; and the filter coefficients are modified by an adaptive control dependent on the measured lifting motion values.

15. The method according to claim 2 wherein an operating temperature of the engraving element is measured to obtain operating temperature measured values; and the filter coefficients are modified by an adaptive controller dependent on the operating temperature measured values.

16. The method according to claim 1, wherein a hysteresis effect is compensated by correction of the engraving data according to a correction curve inverse relative to a hysteresis curve.

17. The method according to claim 16 wherein the compensation of the hysteresis effect is implemented before the digital filtering of the engraving data.

18. The method according to claim 1 wherein the engraving data are subjected to a cut depth correction before the digital filtering.

19. The method according to claim 1 wherein the engraving data are calibrated to "light " and "dark" before the digital filtering.

20. The method according to claim 1 wherein the periodic raster signal is calculated from stored function value data.

21. The method according to claim 1 wherein function value data and filtered engraving data are added in order to obtain engraving control data; and the engraving control data are converted into the engraving control signal by digital-to-analog conversion.

22. The method according to claim 1 wherein the printing comprises a printing cylinder.

23. A method for signal processing in an electronic engraving machine for engraving, comprising the steps of:

providing engraving data that represent gradations between "light " and "dark" to be engraved;

subjecting the engraving data to a filtering to create filtered engraving data for compensation of a faulty lifting motion of an engraving stylus of an engraving element;

acquiring an engraving control signal by superimposition of the filtered engraving data with a periodic raster signal for generating an engraving raster;

controlling with the engraving control signal a lifting motion of the engraving stylus of the engraving element; and engraving with the lifting motion of the engraving stylus.

* * * * *